United States Patent [19]

Galloway

[11] Patent Number: 5,034,571
[45] Date of Patent: Jul. 23, 1991

[54] POWER CORD RETRACTOR FOR RECREATIONAL VEHICLE

[76] Inventor: Albert D. Galloway, 247 W. Dinehart Ave., Elkhart, Ind. 46517

[21] Appl. No.: 435,630

[22] Filed: Nov. 13, 1989

[51] Int. Cl.[5] .......................................... H02G 11/02
[52] U.S. Cl. ............................. 191/12.2 A; 191/12.4
[58] Field of Search ............... 191/12.2 A, 12.4, 12 R, 191/12.2 R; 280/420, 422; 226/186, 187; 254/264, 265, 382; 114/270; 439/4, 501, 528; 307/9.1

[56] References Cited

U.S. PATENT DOCUMENTS

| | | | |
|---|---|---|---|
| 3,550,830 | 12/1970 | Lagogue | 226/187 X |
| 3,604,381 | 9/1971 | Neidenberg | 114/270 |
| 3,641,472 | 2/1972 | Phillips, Jr. | 280/422 X |
| 4,138,177 | 2/1979 | Van Valer | 439/4 |
| 4,343,420 | 8/1982 | Scott | 226/187 X |
| 4,604,528 | 8/1986 | Norton | 307/9.1 |
| 4,692,569 | 9/1987 | Winner | 191/12.2 A |
| 4,730,089 | 3/1988 | Pepper | 191/12.2 A X |
| 4,853,500 | 8/1989 | Tydlacka | 191/12 R |
| 4,893,037 | 1/1990 | Schwartz | 191/12.2 A X |

FOREIGN PATENT DOCUMENTS 527616  7/1956  Canada .................................. 226/186

*Primary Examiner*—David A. Bucci
*Attorney, Agent, or Firm*—Flynn, Thiel, Boutell & Tanis, P.C.

[57] ABSTRACT

A retractor device is mounted a recreational vehicle for permitting powered retraction of the external power cord. The power cord is normally stored within an interior compartment and is accessible through an openable cover when extension of the power cord and connection to an external electrical power source is desired. A retractor device is mounted interiorly of the cover and has a pair of generally parallel but spaced rollers which are relatively spring urged toward one another for gripping the power cord therebetween. The rollers are synchronously driven in opposite rotational directions from a drive motor which, through a suitable control switch, is powered from a low voltage direct current source, such as the vehicle battery. At least one roller can be moved, in opposition to the springs, into a release position by a manually-actuated release element to effectively disengage the cord when manual extension of the power cord is desired.

7 Claims, 3 Drawing Sheets

POWER CORD RETRACTOR FOR RECREATIONAL VEHICLE

FIELD OF THE INVENTION

This invention relates to a device for permitting automatic retraction of an external power cable for a recreational vehicle.

BACKGROUND OF THE INVENTION

Recreational vehicles such as motor homes, travel trailers and the like conventionally have a dual internal electrical system, one being a direct-current low-voltage system coupled to the vehicle battery for controlling minimal appliances such as a small number of lights, and the other being a standard high-voltage alternating current system (such as a conventional 110volt system) used for energizing not only lights but also appliances such as a refrigerator, stove and the like. This conventional 110 volt alternating current system can be electrified only when the recreational vehicle is stationarily parked, and for this purpose the vehicle has an elongate power cord which is normally stored within an interior storage compartment accessible through an operable door formed in one side of the vehicle. The power cord has one end thereof anchored to a control box which is part of the electrical system. The elongate cord can be manually pulled outwardly from the vehicle and is provided with a plug at the free end so as to permit connection to a stationary power post such as provided in a campground or the like. With this known arrangement, it is necessary for the operator to manually pull the power cord from the vehicle and plug it into the power post. When it is desired to disconnect and move the vehicle, then the power cord is manually unplugged and the operator then manually feeds the cord back into the vehicle storage compartment. This latter operation is generally undesirable since often times the cord is both wet and dirty due to its having been disposed on the ground overnight, and handling of the cord is thus a dirty and undesirable task. Further, such cord is relatively heavy, particularly a 50 amp cord.

Accordingly, it is an object of this invention to provide a device which mounts on the vehicle and can be driven from the low voltage direct current system of the vehicle, with the device cooperating with the power cord to permit the power cord to be automatically retracted into the vehicle storage compartment after the power cord has been disconnected from the external power post. This device hence permits avoidance of any significant manual handling of the cord during retraction of the cord into the vehicle, and permits the retraction to take place in a very simple and timesaving manner.

In the power cord retractor device of the present invention, the recreational vehicle is provided with a conventional operable access door, behind which is stored the cord. The door has a small opening for accommodating the cord when the cord extends exteriorly of the vehicle and the door is closed. Positioned behind the door, within the front of a cord storage area, is a pair of vertically spaced driving rollers having exterior surfaces which permit a secure driving engagement with substantially diametrically opposite sides of the cord. The cord passes between the rollers, and the rollers are preferably spring urged toward one another to effect secure driving engagement with cord therebetween. The rollers are driven synchr in opposite directions from a motor, the latter being electrified from the low voltage direct current system of the vehicle, such as from a 12-volt battery. An operator-controlled switch controls energization of the motor when retraction of the cord is desired. Such switch may be provided on the vehicle directly inside the door or, in an alternate embodiment, may be provided on the remote or free end of the power cord (such as at the plug end of the cord) so as to be accessible to the operator at the time the power cord is unplugged from the external power post. If the motor is used to drive the rollers solely for cord retraction, then an operator-actuated release element is provided to effect increased separation between the rollers to facilitate the outward pulling of the cord by the operator when the cord is being hooked up to an external power post.

Other objects and purposes of the present invention, and variations thereof, will be apparent to persons familiar with recreational vehicles and external power cords provided thereon, upon reading the following specification and inspecting the accompanying drawings.

Figure 1:
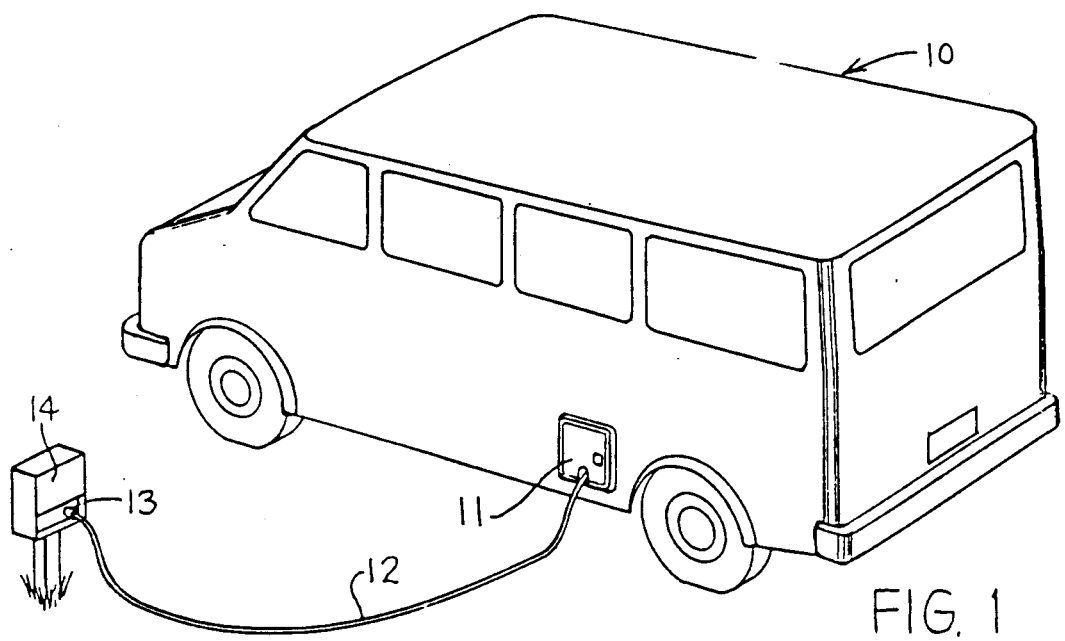
FIG. 1 diagrammatically illustrates a recreational vehicle with its external power cord coupled to a power post.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. The word "inwardly" will also refer to the retrieving or pulling in of the cord for storage purposes, whereas "outward" will refer to the outward movement or pulling of the cord for connection to an external power post. Said terminology will include the words specifically mentioned, derivatives thereof, and words of similar import.

DETAILED DESCRIPTION

Referring to the drawings and specifically FIG. 1, there is diagrammatically illustrated a recreational vehicle 10, such as a motor home. Such vehicle typically has an operable cover or door 11 associated with the exterior vehicle wall so as to provide access to an elongate flexible electrical power cord 12 which extends into the vehicle for connection to a power box (not shown), which power box in turn connects to the internal electrical circuits which are adapted to be powered by conventional alternating-current electricity which in the U.S.A. is typically 110 volts but may also be 220 volts. The cable 12 at its free end is provided with a conventional electrical plug 13 for connection to a suitable externally-located electrical power supply post 14, such as is conventionally provided in campgrounds and the like.

Figure 2:
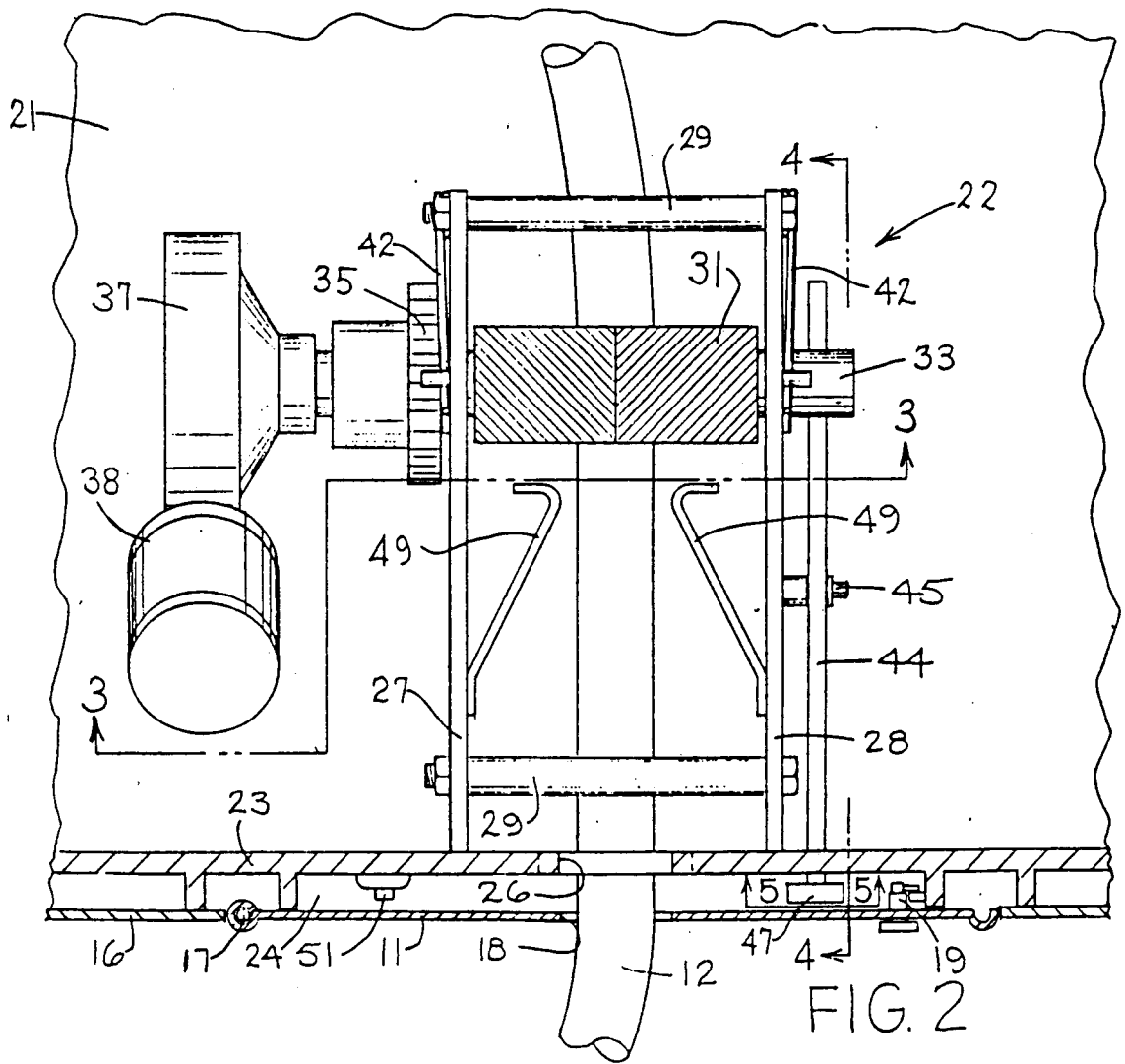
FIG. 2 is a top fragmentary sectional view illustrating the power cord retraction device of the present invention.

As illustrated by FIG. 2, the access cover 11 is generally positioned within an opening formed in a vehicle side wall 16 so as to be substantially flush therewith, and the cover is normally swingably supported by a hinge 17 so as to be movable into an open position. The cover 11 conventionally has a small slotlike opening 18 which extends therethrough and projects upwardly from the lower edge thereof so as to accommodate and permit passage therethrough of the power cord 12 when the cover 11 is closed. The cover 11 also conventionally mounts thereon a key-activated lock 19 which permits securing of the cover in the closed position.

According to the present invention, there is provided a power cord retrieval device 22 which is mounted on the recreation vehicle inwardly from the cover 11 so as to facilitate retraction of the power cord 12 into an interior storage compartment 21. This retraction device 22 is disposed directly rearwardly of a wall 23 which is disposed generally parallel to but spaced inwardly from the closed cover 11 so as to define a small compartment or space 24 therebetween. This inner wall 23 hence effectively isolates the compartment 21 from the outside when the door 11 is opened. The inner wall 23 has an opening 26 therethrough for permitting passage of the power cord 12, which opening 26 is generally aligned with the cover opening 18.

The power cord retracting device 22 includes a pair of generally parallel but sidewardly spaced support walls 27 and 28 which project inwardly from the inner wall 23 and are supported on and project upwardly from a base or bottom wall 25. These support walls 27 and 28 are disposed on opposite sides of the cable opening 26, and are maintained in stationary spaced relationship to one another by several rodlike spacers 29 which extend therebetween and are suitably secured by threaded fasteners.

The support plates 27 and 28 rotatably mount therebetween a vertically spaced pair of cord-driving rollers 31 and 32, which rollers are nonrotatably associated with respective support shafts 33 and 34, the latter being rotatably supported on and projecting through the support walls 27 and 28. The rotational axes of the support shafts 33 and 34 extend in generally parallel relationship to one another, and these shafts at one end have gears 35 and 36 respectively and nonrotatably secured thereto. Gears 35 and 36 are disposed in direct meshing engagement with one another so as to effect equal and simultaneous rotation of rollers 31 and 32 in opposite rotational directions. The one shaft is also connected through a suitable conventional speed reducer 37 to an electric drive motor 38, the latter motor being a low-voltage direct-current motor so as to be energizable from the vehicle battery.

Each of the rollers 31 and 32 is provided with a rough or high-friction surface so as to permit the rollers to create a nonslippable driving engagement with the surface of the cord 12. For this purpose, the rollers 31 and 32 in the preferred embodiment are metal and are provided with a textured surface created essentially by forming a knurled pattern on the surface. The knurled pattern preferably is formed so as to have a herringbone configuration so that the ribs or knurls hence define a generally V-shaped pattern which the apex of the V being substantially in the center radial plane for engagement generally along the longitudinally extending axis of the power cord. The upper and lower rolls 31 and 32 are identical except that the lower roll 32 is axially reversely oriented relative to the upper roll 31 so that the V-shaped pattern of both rolls, where they contact the opposed upper and lower surfaces of the power cord, will both be similarly oriented with respect to the direction of cord movement.

Figure 3:
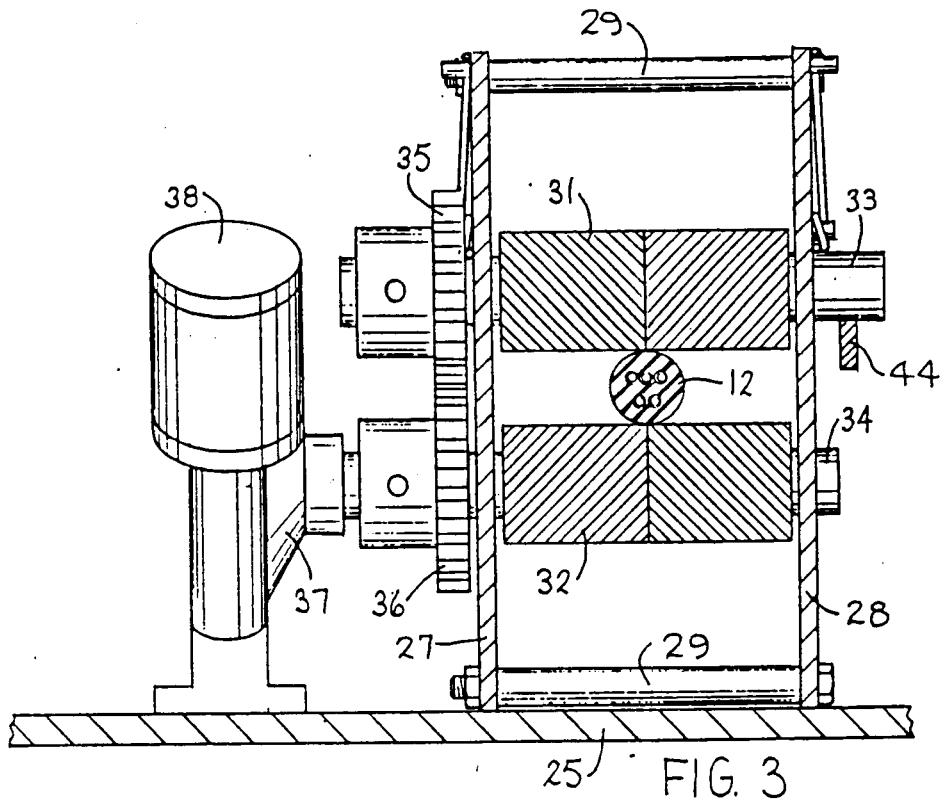
FIG. 3 is a fragmentary sectional view taken substantially along line 3—3 in FIG. 2.
Figure 4:
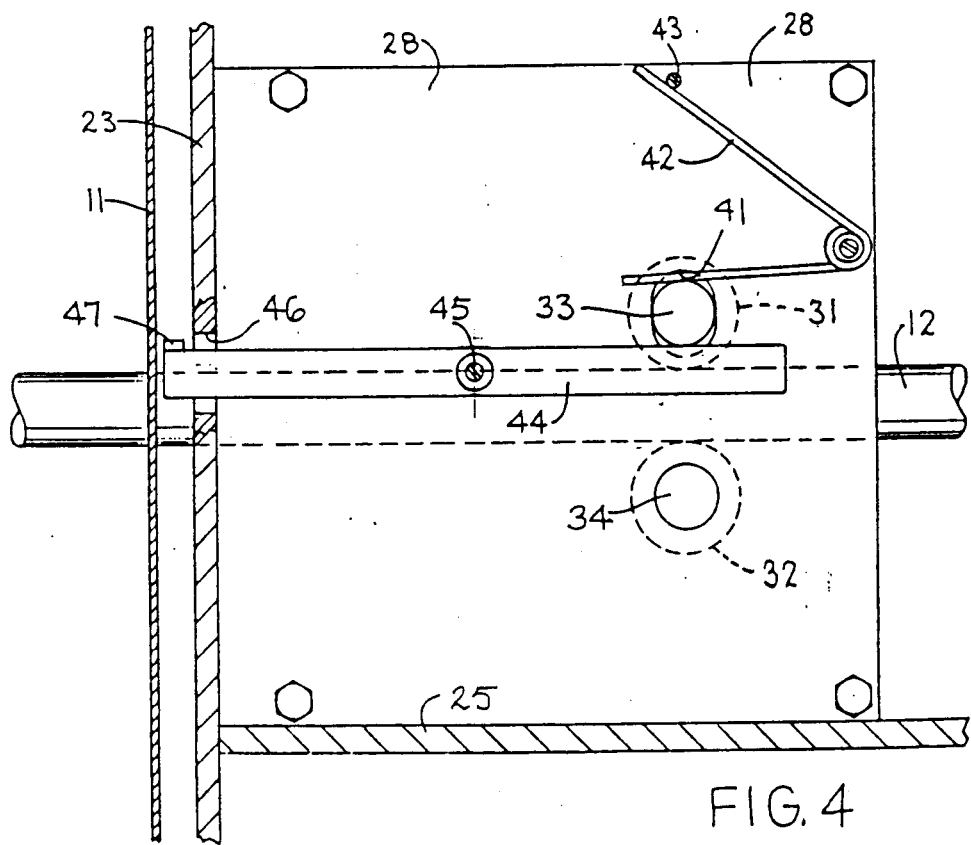
FIG. 4 is a fragmentary view taken substantially along line 4—4 in FIG. 2.

The support plates 27, 28 are provided with vertically elongate slots 41 (FIG. 4) formed therein, through which project the ends of the support shaft 33 associated with the upper roller 31. These slots 41 permit limited vertical floating movement of the upper roller 31 relative to the lower roller 32. The shaft 33 and the upper roller 31 carried thereby is normally resiliently urged downwardly toward the lower roller 32 by springs 42 which are mounted exteriorly adjacent the support walls 27, 28. Each of the springs 42 in the illustrated embodiment is formed as a generally V-shaped cantilevered spring having an upper leg disposed in abutment with a fixed stop 43, whereas a lower leg bears downwardly against the projecting end of the shaft 33 to hence urge the roller 31 downwardly toward the bottom of the respective slot 41. These springs 42 thus maintain the upper roller 31 in resilient gripping engagement with an upper side of the cord 12, and in turn maintain the lower side of the cord 12 in gripping engagement with the lower roller 32, as illustrated by FIG. 3.

Figure 5:
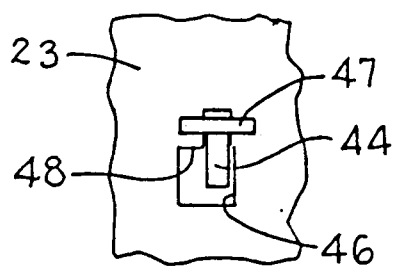
FIG. 5 is a fragmentary view taken substantially along line 5—5 in FIG. 2.

To permit release of the gripping engagement of the cord 12 between the rollers 31 and 32, the retraction device 22 also includes a manually-actuatable release element 44. This element 44 comprises an elongate lever which extends exteriorly along the outer side of the support wall 28, and which is hinged intermediate its ends about a hinge pin 45. The inner end of release lever 44 projects directly under the end of the top roller shaft 33. The other end of release lever 44 projects outwardly through an opening 46 formed in the inner wall 23 so as to project into the intermediate compartment 24. The projecting end of the release lever 44, as disposed in the compartment 24, can be provided with an enlarge gripping tab or plate 47, thereon if desired. The release lever 45, by manually depressing the tab or plate 47, can be pivoted counterclockwise (FIG. 4) about the pivot 45 so as to effect lifting of the end of the top roller shaft 33 within the slot 41, and thereby effect release of the engagement between the upper roller 31 and the power cord 12. The release lever 44 can be latch in its raised or released position by deflecting the front or outer end of lever 44 sidewardly when in the lowered position so as to position the lever beneath the shoulder 48 (FIG. 5). The natural flexibility of the lever 44 coupled with general looseness in the overall cooperation of the components will readily permit such sideward displace of the outer end of the release lever.

The support walls 27 and 28 also mount, on the inner sides thereof, a pair of resilient cantilevered cable guides 49, which guides converge as they project inwardly toward the rollers and define an opening which facilitates guiding of the cord into and between the rollers 31 and 32 substantially at the middles thereof. In this fashion, the cord 12 has possible sliding contact with only the outer rounded ends of the guides 49 in close proximity to the nip between the rollers 31 and 32 to hence ensure proper positioning of the cord as it is feed between the rollers, while at the same time minimizing possible frictional contact between the cord and other components of the device. However, it will be appreciated that, if desired, the guides 49 can be eliminated and the support walls 27 and 28 can be positioned in much closer relationship to one another so that the walls themselves will effectively function as guides for closely confining the power cord.

Figure 6:
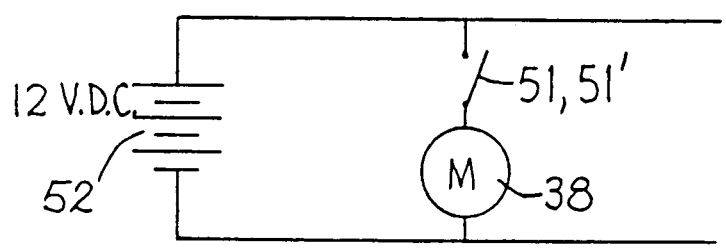
FIG. 6 diagrammatically illustrates the manner in which the retrieval device motor is coupled to the vehicle battery.

To control the motor 38, the device 22 includes a manually actuatable switch 51 (FIG. 2), such as a conventional toggle- or push-type switch. Such switch 51 can be mounted so as to be accessible within the intermediate compartment 24, such as by being mounted on the inner wall 23, and hence accessible only when the cover 11 is opened. This switch 51 is coupled in series with the motor 38, and both are connected so as to be energized from the conventional vehicle battery 52 as illustrated by FIG. 6.

Figure 7:
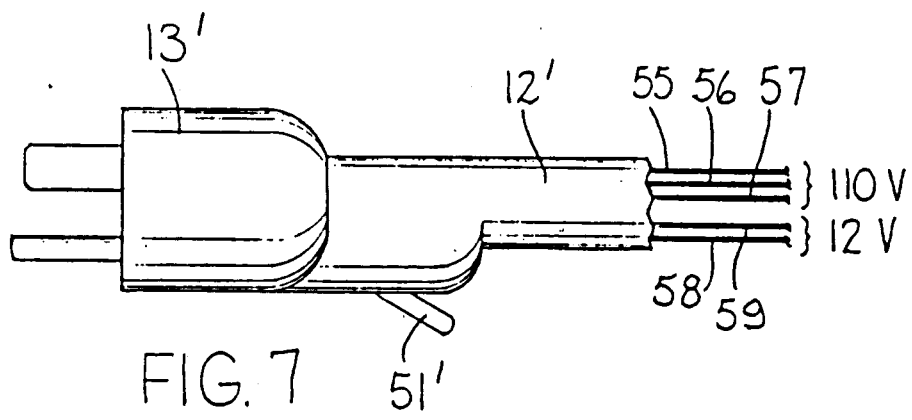
FIG. 7 shows a variation wherein the control switch for the retrieval device motor is provided on the plug-end of the power cord.

As an alternate and preferred construction, and referring to FIG. 7, the switch 51' for controlling energization of the motor 38 can be mounted directly adjacent the plug end 13' of the power cord 12'. In this variation, the power cord 12' again includes three conventional conductors 55, 56, 57 which define the 110 volt alternating-current circuit, which circuit is energized from the exterior power post. This power cord 12', however, also contains two additional conductors 58, 59 which are coupled to the switch 51' (such as a toggle or push button switch) and which extend along the power cord 12' and connect the low-voltage direct-current circuitry of the recreational vehicle, specifically the vehicle battery, to the motor 38.

OPERATION

The operation of the power cord retraction device will be briefly described to ensure a complete understanding thereof.

When the power cord 12 is to be coupled to an external power post, the operator unlocks and opens the cover 11, whereby the plug end 13 is readily accessible since such end 13 will normally be stored directly within the intermediate compartment 24. The operator will first depress the tab 47 to effect lifting of the upper roller 31, and then displace the outer end of release lever 44 sidewardly to lock it under the shoulder 48. The upper roller 31 is hence effectively disengaged from the cord 12. The operator can then manually grip the plug end 13 and can then walk away from the vehicle toward the exterior power post 14, thereby pulling the cord 12 from its storage compartment through the space between the rollers and thence outwardly through the access opening 26. The operator can then plug the plug end 13 into the power post. Thereafter the operator can return to the vehicle and close and lock the cover 11, if he has not already done so, while guiding the cord into the access slot 18.

When disconnection and retraction of the power cord 12 is desired, the operator can initially disconnect the plug end 13 from the power post 14, and then return to the vehicle so as to unlock and open the cover 11. The operator then unlatches the release lever 44 by moving it sidewardly from beneath the shoulder 48, whereupon the springs 42 again urge the roller 31 downwardly into secure gripping engagement with the upper surface of the power cord 12. The operator can then activate switch 51 so as to energize motor 38 from the vehicle battery. This effects simultaneous counter rotation of the rollers 31 and 32 at the same speed and, due to the knurled or gripping texture of the surfaces of the rolls, the cord 12 is automatically drawn inwardly into the vehicle and fed inwardly between the rolls so as to be discharged into the interior storage compartment 21. The diameter of the power cord is such that the cord, when being discharged into the compartment 21, will automatically tend to assume a coiled storage configuration. When the cord 12 has been substantially fully retracted so that the plug end 13 is located directly adjacent the access opening 26, the operator will again activate the switch 51 so as to deenergize the motor 38. Cover 11 can then be closed and locked so as to secure the power cord.

With respect to the variation illustrated by FIG. 7, a generally similar operational sequence occurs to effect retraction of the cord. The operator will initial unlock and open the cover 11, and then will unlatch the release lever 44 so that the springs 42 urge upper roller 31 downwardly into gripping engagement with the power cord 12'. The operator will then walk over to the power post 14 and effect disconnection of the plug end 13 therefrom. While still holding the plug end 13', the operator will then activate switch 51' to effect energization of motor 38 and hence driving of rollers 31 and 32 to effect retraction of the power cord. During this retraction of the power cord, the operator can continue to hold the plug end 13' and basically walk inwardly toward the vehicle as the cord 12' is being retracted. When the cord 12' has been substantially fully retracted so that the plug end 13 is directly adjacent the access opening 26, then the operator again C activates the switch 51' to deenergize the motor 38. Door 11 is then closed and locked to secure the power cord arrangement.

If necessary or desirable in order to handle larger or heavier cords, the device may be provided with two pairs of rollers 31, 32 disposed in closely adjacent relationship to one another so as to increase the gripping and hence driving engagement between the rollers and the power cord. The second pair of rollers can be substantially identical to and rotatably driven in the same manner, such as by merely coupling an intermediate idler gear in engagement between the gears of either the adjacent upper rollers or the gears of the adjacent lower rollers.

The drive gears 35 and 36, when disposed in direct meshing engagement as illustrated in FIG. 3, are preferably provided with loosely fitting radially elongate teeth, or are formed in a manner similar to sprocket wheels, so as to permit at least limited radial movement therebetween due to the permissible upward lifting of the upper roller 31 when the lever 44 moves the roller 31 upwardly. However, the lever 44 is preferably provided only adjacent one side of the device so that roller 31 hence tends to pivot substantially about the gear 35 as it swings upwardly, and hence this upward release of roller 31 has little influence on the engagement between gears 35 and 36. Further, these gears 35 and 36 are in rotatable meshing engagement with one another only when the top roller 31 is again returned downwardly into gripping engagement with the power cord 12.

As a further variation, the device 22 may also be used to effect positive outward driving of the power cord when connection of the power cord to an external power post is desired. One way of accomplishing outward driving, in addition to inward retraction, is to use a reversible motor 38. In such case the switch 51 or 51' can be a three-position switch having not only an off position, but also forward and reverse rotation positions so that the operator can select the desired position depending upon whether the cord is being extended or retracted. As a further substitute for a reversible motor, however, it will be apparent that a shiftable gear mechanism connected between the motor and the rollers could also be provided for permitting selected forward or reverse rotation of the rollers.

To provide desired gripping and hence driving of the cord when retraction is desired, it is believed that the rollers 31, 32 should have a diameter which is similar to although normally somewhat larger than the diameter of the power cord. For example, it is believed that the rollers preferably should have a diameter in the range of from about 1.0 to about 2.0 times the power cord diameter. This hence provides for a secure gripping of the rollers with the power cord over a small circumferential area to thereby provide desired uniform gripping and driving of the power cord. Further, the use of rollers of such diameter, in comparison to rollers of much greater diameter, is obviously desirable in that it permits the overall cord retraction device to be made of a small and compact size.

It will appreciate that numerous other drive arrangements, such as belts or the like, can be provided for coupling the drive motor to the roll shafts. Also, the rollers 31, 32 can be constructed of plastic or rubber materials having surface characteristics, such as roughness, high friction, and/or limited elastic deformability, as to permit secure gripping and driving engagement with the power cord.

While the invention has been illustrated above with respect to a motor home, it will be appreciated that the cord retraction device of the present invention is also applicable for use on numerous other forms of recreational vehicles such as travel trailers, vans, trucks, boats, and the like.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a recreational vehicle having a low-voltage direct-current power source, a high-voltage alternating-current electrical circuit, an elongate flexible power cord connected to said electrical circuit and disposed in a storage compartment within the vehicle, the power cord having plug means on a free end thereof and being extendible outwardly from the vehicle for connection to an external source of high-voltage alternating-current power, and an operable cover mounted onthe vehicle for normally closing the compartment and confining the power cord therein, the improvement comprising a power cord retraction device mounted on said vehicle inwardly of said cover for permitting powered retraction of the power cord into the storage compartment, wherein said power cord retraction device includes a pair of cord-engaging rollers disposed for grippingly engaging the cord therebetween, and a drive motor dricingly interconnected to said pair of rolles for effecting simultaneous rotation thereof in opposite rotational directions for pulling the power cord inwardly from exteriorly of the vehicle and discharging the power cord into the storage compartment, wherein said drive motor is coupled to said low-voltage direct-current power source, spring means coacting with at least one said roller for resiliently urging said rollers relatively toward one another for gripping engagement with the power cord therebetween, manually-actuatable release means coacting with said one roller for effecting movement thereof in opposition to said spring means for effecting release of said one roller from said power cord, manually-actutatable switch means electrically coupled between said low-voltage direct-current power source and said drive motor for permitting selective actuation of said drive motor, an inner wall secured to said vehicle in generally parallel but inwardly spaced relationship from said cover when said cover is closed, said inner wall being spaced from the cover to define an interior compartment therebetween, said switch means and said release means being accessible within said inner compartment solely when said cover is in an open position, said inner wall having opening means therethrough for permitting passage of said power cord, and said rollers being mounted rearwardly of said inner wall.

2. A vehicle according to claim 1, including a lock structure associated with said cover for normally securing the cover in said closed position.

3. In a recreational vehicle having a low-voltage direct-current power source, a high-voltage alternating-current electrical circuit, an elongate flexible power cord connected to said electrical circuit and disposed in a storage compartment within the vehicle, the power cord having plug means on a free end thereof and being extendible outwardly from the vehicle for connection to an external source of high-voltage alternating-current power, and an operable cover mounted on the vehicle for normally closing the compartment and confining the power cord therein, the improvement comprising a power cord retraction device mounted on said vehicle inwardly of said cover for permitting powered retraction of the power cord into the storage compartment, wherein said power cord retraction device includes a pair of cord-engaging rollers disposed for grippingly engaging the cord therebetween, and a drive motor drivingly interconnected to said pair of rollers for effecting simultaneous rotation thereof in opposite rotational directions for pulling the power cord inwardly from exteriorly of the vehicle and discharging the power cord into the storage compartment, manually-actuatable switch means electrically coupled between said low-voltage direct-current power source and said drive motor for permitting selective actuation of said drive motor, an inner wall secured to said vehicle in inwardly spaced relationship from said cover when said cover is closed, said inner wall cooperating with the cover to define an interior compartment therebetween, said switch means being accessible within said inner compartment solely when said cover is in an open position, said inner wall having opening means therethrough for permitting passage of said power cord, and said rollers being mounted rearwardly of said inner wall.

4. A vehicle according to claim 3, including manually-actuatable release means coacting with one of said rollers for effecting release of said one roller from said power cord, and wherein said inner wall has a wall portion which is generally parallel with said cover when the latter is in said closed position, said wall portion having said opening means formed therethrough.

5. A vehicle according to claim 4, including a lock structure associated with said cover for normally securing the cover in said closed position.

6. A vehicle according to claim 3, including a lock structure associated with said cover for normally securing the cover in said closed position.

7. A power cord retraction device for a recreational vehicle, comprising:

an elongate flexible electrical power cord for transmitting at least 110-volt alternating-current electricity therethrough, said power cord having a free end provided with a plug structure thereon for connection to an external power source, said power cord at the other end being connected to an electrical power terminal within the recreational vehicle;

a generally vertical wall structure having an opening therethrough for permitting the power cord to be fed outwarldy through the opening for connection to the external power source, the plug structure on the free end of the power cord being normally positioned outwardly of said wall structure, the other end of said power cord being connected to the vehicle inwardly of said wall structure;

an openable cover moable between open and closed positions, said cover when in the closed position being generally disposed outwardly from said wall structure and cooperating therewith for defining an interior compartment therebetween, said plug structure being normally stored rearwardly of said cover within said interior compartment when the power cord is in its fully retracted position;

a lock structure associated with said cover for normally securing the cover in said closed position;

a pair of rotatable cord-retraction rollers disposed in generally parallel and adjacent but spaced relationship so as to define a gap therebetween for accommodating the power cord, the rollers having nonsmooth peripheral surfaces for driving engagement with diametrically peripheral surfaces for driving said rollers being positioned inwardly of said wall structure;

motor means drivingly coupled to said rollers for effecting simultaneous and synchronous rotation of said rollers in opposite rotational directions to effect retraction of the power cord inwardly through the opening and thence between the rollers for storage of the cord within the vehicle inwardly of said wall structure; and spring means cooperating with at least one of said rollers for normally relatively urging the rollers toward one another for gripping of the power cord therebetween;

manually-actuatable release means for permitting displacement of said one roller in opposition to the urging of said spring means to permit release of said roller from driving engagement with said power cord, said release means including a manually-engageable release member which projects into said interior compartment so as to be manually accessible and actuatable only when the cover is in said open position; and switch means for controlling energization of said motor means.

* * * * *

UNITED STATES PATENT AND TRADEMARK OFFICE
CERTIFICATE OF CORRECTION

PATENT NO. : 5 034 571

DATED : July 23, 1991

INVENTOR(S) : Albert D. GALLOWAY

It is certified that error appears in the above-identified patent and that said Letters Patent is hereby corrected as shown below:

Column 1, line 68; change "synchr" to ---synchronously---.

Column 2, line 2; change "lcw" to ---low---.

Column 6, line 33; change "C activates" to ---activates---.

Column 7, line 66; change "dricingly" to ---drivingly---.

change "rolles" to ---rollers---.

Column 9, line 3; change "alock" to ---a lock---.

line 23; change "outwarldy" to ---outwardly---.

line 30; change "moable" to ---movable---.

Column 10, line 10; change "peripheral surfaces for driving" to ---opposite sides of the power cord---.

Signed and Sealed this

Twenty-third Day of March, 1993

*Attest:*

STEPHEN G. KUNIN

*Attesting Officer*     *Acting Commissioner of Patents and Trademarks*